United States Patent
Brey et al.

(10) Patent No.: US 7,657,945 B2
(45) Date of Patent: Feb. 2, 2010

(54) SYSTEMS AND ARRANGEMENTS TO ADJUST RESOURCE ACCESSIBILITY BASED UPON USAGE MODES

(75) Inventors: Thomas M. Brey, Cary, NC (US); Giles Roger Frazier, Austin, TX (US); Gregory Francis Pfister, Austin, TX (US); William J. Rooney, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 744 days.

(21) Appl. No.: 11/070,053

(22) Filed: Mar. 2, 2005

(65) Prior Publication Data

US 2006/0198525 A1 Sep. 7, 2006

(51) Int. Cl.
*G06F 7/04* (2006.01)
*H04L 9/32* (2006.01)

(52) U.S. Cl. .................. 726/27; 713/165; 713/167; 726/2

(58) Field of Classification Search ......... 713/165–167; 726/2, 26–31; 709/223–226
See application file for complete search history.

(56) References Cited

U.S. PATENT DOCUMENTS

| 6,125,411 | A | 9/2000 | Sato | |
|---|---|---|---|---|
| 6,633,916 | B2 | 10/2003 | Kauffman | |
| 2004/0205253 | A1 | 10/2004 | Arndt et al. | |
| 2005/0165806 | A1* | 7/2005 | Roatis et al. | 707/100 |

* cited by examiner

*Primary Examiner*—Benjamin E Lanier
(74) *Attorney, Agent, or Firm*—Diana Roberts Gerhardt; Schubert Osterrieder & Nickelson PLLC (57) ABSTRACT

Systems and arrangements to adjust resource accessibility based upon usage modes are contemplated. Embodiments may include a supervisor instance such as an operating system that is adapted to select one or more supervisor keys from a set of supervisor keys available to the host node or platform upon which the supervisor instance is operating. The supervisor instance may select the supervisor key(s) based upon an association of the supervisor instance with a usage mode represented by a supervisor key name. In many embodiments, supervisor key names may be associated with resources via with one or more of the supervisor keys based upon the resources needed when operating in the usage modes by a system administrator. Once the supervisor instance is initialized, the supervisor instance may issue client keys that allow access to subsets of the resources available to the supervisor instance based upon usage modes of the clients.

20 Claims, 6 Drawing Sheets

SYSTEMS AND ARRANGEMENTS TO ADJUST RESOURCE ACCESSIBILITY BASED UPON USAGE MODES

FIELD

The present invention generally relates to the field of managing access to resources on a networked computer system. More particularly, the present invention relates to systems and arrangements to adjust resource accessibility based upon usage modes such as the accessibility of resources on an InfiniBand™ network to a supervisor instance based upon a usage mode associated with the supervisor instance and the resources of that supervisor instance makes available to clients of that supervisor instance based upon the usage mode of the client.

BACKGROUND

Many different types of computing systems have attained widespread use around the world. These computing systems include personal computers, servers, mainframes and a wide variety of stand-alone and embedded computing devices. Sprawling client-server systems exist, with applications and information spread across many PC networks, mainframes and minicomputers. In a distributed system connected by networks, a user may access many application programs, databases, network systems, operating systems and mainframe applications. Computers provide individuals and businesses with a host of software applications including word processing, spreadsheet, accounting, e-mail, voice over Internet protocol telecommunications, and facsimile, as well as databases, service objects, file systems, I/O devices e.g., data storage, and the like.

Users of digital processors such as computers continue to demand greater and greater performance from such systems for handling increasingly complex and difficult tasks. As a result, demands for fast communications and accessibility to a variety of resources have increased significantly. As an illustration, in some current systems, if a user requires high reliability on some files and fast access on other files, a system administrator may need to allocate storage on different volumes to provide the different storage characteristics. The user may then have to keep track of where the different types of files are located within the network. For example, to obtain high reliability, a file may be stored within a volume corresponding to a data mirroring storage device. Alternatively, a volume corresponding to a data striping storage device may be used for storing a file requiring higher performance.

To satisfy the growing demands for availability of resources while balancing the availablilty with the costs of purchasing and maintaining large networks, new network models also allow dynamic allocation, deallocation, and reallocation of resources shared by multiple processes operating on multiple computer systems. For instance, multiple single or multi-processor computer systems may be connected together to create a cluster. Clusters of multiple systems provide increased compute capability. One such clustered system is a new industry standard architecture, commonly called InfiniBand™. InfiniBand™ is capable of providing decreased latency, greater bandwidth and increased expandability by providing a system-area network (SAN) that includes a channel-based, switched-fabric technology.

Each device or node coupled with networks such as SANs, whether a processor or I/O device, includes a channel adapter. The messages are transmitted from one device's channel adapter to another device's channel adapter via switches. InfiniBand™, for example, provides an industry standard interconnect for clustering and defines a mechanism for message transfer between end nodes. The Architecture outlines key management requirements for initialization, configuration, and control of communications between the nodes connected to the network.

In an InfiniBand fabric, for example, a solution has been proposed which allows resources within an I/O Unit (IOU) to be restricted to a set of hosts. Hosts are identified by their Globally Unique Identifiers (GUIDs). The resources which may be assigned to a host include access to Service Objects, number of Queue Pairs (QPs) reserved for this host, maximum number of QPs that the host may consume, and the like.

A problem with this approach is that hosts may be used for multiple purposes, and these varied purposes may require different access rights. For example, if a host is normally used as a development and test system, then an installation may wish to restrict access, disallowing access to service objects which represent production resources, and allowing only a limited set of QPs.

However, that same system may also serve as a failover target. For example, in the event that a production system fails, or additional capacity is required for production workloads, the development and test system may run production workloads. In this case the system will need the access rights and resource allotment associated with the production system.

Solutions that require a system programmer to go out to a management console, and redefine the resources so the host could access the production resources when the failover occurs are impractical and problematic. Given that the environment of failovers is normally very hectic, the added steps of doing this not only increases the time required to failover, but also provides an opportunity for human error where either this step is overlooked, or not flawlessly implemented.

Solutions that provide rights to the host node for all the possible resources to avoid the problems with reprogramming resource accessibility invite other problems. More specifically, hosts may be used for various purposes, for example a host may normally be used for software development, however it may also be used for production when the primary host fails, or when additional capacity is required. In such an environment, a customer may not wish to allow the host to have access rights to all the same resources when operating in each mode.

Therefore, there is a need for systems and arrangements to adjust resource accessibility based upon usage modes of the host nodes such as the accessibility of resources on an InfiniBand™ network to a supervisor instance based upon a usage mode associated with the supervisor instance and the resources of that supervisor instance makes available to clients of that supervisor instance based upon the usage mode of the client.

SUMMARY

The problems identified above are in large part addressed by systems and arrangements to adjust resource accessibility based upon usage modes. One embodiment comprises a method to define a subset of resources available to a supervisor instance to assign to clients operating under the supervisor instance. The method generally involves determining a set of supervisor keys based upon an identifier associated with the supervisor instance; selecting a supervisor key name based upon a usage mode associated with operation of the supervisor instance; and selecting one or more supervisor keys from the set of supervisor keys based upon the supervisor key name, the one or more supervisor keys to verify authorization for the supervisor instance to obtain a set of client keys, wherein each client key of the set of client keys, when attached to a request by a client of the clients, provides verification of an authorization for the client related to establishment of a connection, the connection being associated with a resource of the subset of resources.

Another embodiment comprises a method for defining access by a client to a subset of resources available to a supervisor instance. The method generally involves determining, by the client, a client key name associated with a usage mode for the client; requesting a client key from the supervisor instance based upon the client key name; receiving the client key from the supervisor instance, the client key being associated with the subset of the resources; and associating the client key with a request to establish a connection with one of the subset of the resources to provide a verification that the client is authorized to access the one of the subset of the resources.

Another embodiment comprises a method for defining a subset of supervisor keys available to a supervisor instance. The method generally involves associating one or more supervisor key names with one or more unique host identifiers; and selecting one or more supervisor keys of the subset of supervisor keys to associate with each of the one or more supervisor key names, wherein the association of the one or more supervisor keys with a supervisor key name of the one or more supervisor key names, defines a subset of the resources that are available to the supervisor instance with the supervisor key name.

Another embodiment comprises a system, which may comprise a configuration to define tables that associate supervisor keys with client keys and with unique host identifiers of nodes to couple with a communications network; a configuration manager coupled with the configuration to define authorized connections between the nodes based upon associations in the tables to prevent unauthorized connections, wherein the configuration manager is adapted to associate one or more supervisor key names with one or more of the unique host identifiers and select one or more supervisor keys of the supervisor keys to associate with a supervisor key name of the one or more supervisor key names, wherein association of the one or more supervisor keys with the supervisor key name defines a subset of resources that are available to a supervisor instance.

A further embodiment comprises machine-accessible medium containing instructions, which when executed by a machine, cause the machine to perform operations for defining access by a client to a subset of resources available to a supervisor instance, comprising determining, by the client, a client key name associated with a usage mode for the client; requesting a client key from the supervisor instance based upon the client key name; receiving the client key from the supervisor instance, the client key being associated with the subset of the resources; and associating the client key with a request to establish a connection with one of the subset of the resources to provide a verification that the client is authorized to access the one of the subset of the resources.

A further embodiment comprises machine-accessible medium containing instructions, which when executed by a machine, cause the machine to perform operations for defining a subset of supervisor keys available to a supervisor instance, comprising determining, by the client, a client key name associated with a usage mode for the client; requesting a client key from the supervisor instance based upon the client key name; receiving the client key from the supervisor instance, the client key being associated with the subset of the resources; and associating the client key with a request to establish a connection with one of the subset of the resources to provide a verification that the client is authorized to access the one of the subset of the resources.

BRIEF DESCRIPTION OF THE DRAWINGS

Other objects and advantages of the invention will become apparent upon reading the following detailed description and upon reference to the accompanying drawings in which, like references may indicate similar elements.

DETAILED DESCRIPTION OF EMBODIMENTS

The following is a detailed description of example embodiments of the invention depicted in the accompanying drawings. The example embodiments are in such detail as to clearly communicate the invention. However, the amount of detail offered is not intended to limit the anticipated variations of embodiments; but, on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Generally speaking, systems and arrangements to adjust resource accessibility based upon usage modes are disclosed. Embodiments may include a supervisor instance such as an operating system, that is adapted to select one or more supervisor keys from a set of supervisor keys available to the host node upon which the supervisor instance is operating, based upon a unique identifier assigned to the host node. Each host node may be a platform such as a personal computer system, a workstation, a server, a clustered system, or the like. In many embodiments, a device manager, possibly on a separate configuration management node, determines the set of supervisor keys based upon a unique identifier assigned to the host node. The supervisor instance may select the supervisor key(s) based upon an association of the supervisor instance with a usage mode represented by a supervisor key name. Supervisor key names may include, for instance, "Production" and "Development/Test", or abbreviations thereof, and they are representative of the function that the supervisor instance is intended to perform. In many embodiments, supervisor key names may be configured by a system administrator and associated with one or more of the supervisor keys in the set of supervisor keys based upon the resources needed by the supervisor instance when operating in the different usage modes.

The system administrator may also provide a process or algorithm accessible by the supervisor instance that allows the supervisor instance to determine its usage mode to select a supervisor key name. This might be done, for example in z/OS, by placing the name in a new member of "SYS1.PARMLIB". For UNIX, this could be done by placing the name in a configuration file in the "/etc" directory.

Once the supervisor instance selects the supervisor key name and then selects the supervisor key(s) associated with the supervisor instance, the supervisor instance has access to a subset of the resources available to the host node based upon the resources associated with the supervisor key(s). In some embodiments, one of the supervisor key names may provide access to all the resources available to the host node.

Once the supervisor instance has selected the supervisor key(s), the supervisor instance may respond to requests from one or more clients. Clients may be applications, file systems, or the like that operate under a supervisor instance and require access to the resources associated with the supervisor instance. The resources may include Service Objects, the Service Levels (SLs) a host may use to connect, maximum number of Queue Pairs (QPs) that the host node may consume, and the like.

A client may provide a client key name in a request for a client key. The supervisor instance may then verify that the client is authorized to use the client key via a private algorithm or other configuration provided by a system administrator. For example, if the client does not provide a client key name, the supervisor instance may provide a default client key. Further, if the client is associated with a particular process, the configuration file may define a default usage, which is represented by a particular client key name and associated with a client key. After being associated with the client key, the client key may be passed to the client by the supervisor instance and utilized by the client thereafter to access a subset of the resources available to the supervisor instance in accordance with the usage mode of the supervisor instance and the usage mode of the client.

In further embodiments, a configuration management node may generate a Platform Key Table and a Client Key Table to facilitate assignment of supervisor keys to supervisor instances and client keys to clients, respectively. The Platform Key Table may associate supervisor key names with globally unique identifiers (GUIDs) of host nodes and supervisor keys. And, the Client Key Table may associate client key names with client keys. In one embodiment, records of the Client Key Table are maintained by their corresponding host nodes or supervisor instances.

While portions of the following detailed discussion describe many embodiments in conjunction with an InfiniBand™ network model and a hosts that are logically-partitioned systems, upon review of the teachings herein, a person of ordinary skill in the art will recognize how the present invention may be implemented in other types of networks and even in virtual networks within, for example, logically-partitioned computer systems or with other types of computer systems in place of or in addition to logically-partitioned systems.

Turning to the drawings, FIG. 1 illustrates an embodiment of a system 100 having a configuration management node 150 to manage communications between a host node 110 and a resource node 160. In general, system 100 is adapted to allow supervisor instances such as supervisor instances 122 and 128 to obtain access to resources such as service objects 166 and private data 168 based upon variable current purposes or usage modes of the supervisor instances 122 and 128, which are represented by supervisor key names. System 100 may also allow the supervisor instances to control which resources can be accessed by different clients such as clients 124 and 130 running under the respective supervisor instances 122 and 128, based upon usage modes of the clients 124 and 130. The usage modes of the clients may be represented by client key names.

In many embodiments, a configuration management node such as configuration management node 150 may define authorized communications between one or more host nodes such as host node 110, one or more resource nodes 160, and one or more other nodes such as nodes that bridge network communications 140 with another network (not shown). More specifically, configuration management node 150 may generate tables 156 that represent authorized communication connections between nodes coupled with communications network 140. In the present embodiment, a communications manager 184 may enforce connections represented by tables 156 by allowing connections that are authorized and disallowing connections that are not authorized.

Configuration management node 150 may comprise a configuration manager 151, tables 156, and configuration 158. Configuration manager 151 provides a device manager 152 and a device administrator 154 to configure, provide access to, and transmit attributes of tables 156 to other nodes such as host node 110 and resource node 160.

Device manager 152 may set Device Management attributes of input-output (I/O) controllers 164 by transmitting the attributes of tables 156 and configuration 158 to Device Management Agent 162 of resource node 160. In several embodiments, device manager 152 comprises a manager key, which can be verified by device management agent 162 to prevent other unauthorized nodes from accessing the attributes of I/O controllers 164. Once tables 156 are generated, the manager key allows device manager 152 to store records of the Platform Resource Pool Table and a Client Resource Pool Table of tables 156 in resource node 160. In many embodiments, device manager 152 will only store records that are associated with resource node 160. Those records may subsequently be used by resource node 160 to selectively grant access to other nodes such as host node 110.

Each record of the Platform Pool Table may identify a unique supervisor key and each record of the Client Pool Table may identify a unique client key associated with a subset of the resources for a supervisor key. FIG. 1B illustrates examples of a Platform Pool Table 180 and a Client Pool Table 185. Once the supervisor key and client key for a resource are identified, the communications manager 184 may only allow access to the service objects 166 by requests that include a valid client key As illustrated in Platform Pool Table 180 of FIG. 1B, device manager 152 may associate resources such as service levels (SLs), the minimum number of queue pairs (QP Minimum), the maximum number of queue pairs (QP Maximum), and a number of service objects with each supervisor key. Service levels are values that enables selection of a virtual lane for a communications connection between nodes and a virtual lane is logical service lane of a channel for a connection that is defined to allow multiple data streams to share the same physical communications channel. Selecting virtual lanes for connections facilitates control of the quality of service (QOS) offered to different types of communications. For instance, a low priority communication may be assigned to a virtual lane that provides a lower bandwidth and a higher priority communications may be allocated higher bandwidth connections. Queue pairs are queues used on both sides of a communications connection to facilitate transmission and receipt of packets via communications network 140. Note also that the Number of Clients assignment in Platform Pool Table 180 indicates the number of unique client keys defined in the Client Pool Table 184.

After device manager 152 configures the Platform Pool Table and sets up the Client Pool Table with supervisor keys and associated client keys, device manager 152 may populate a Client Pool Table with resources such as illustrated in Client Pool Table 185 of FIG. 1B. In particular, device manager 152 may define a subset of the resources available via a supervisor key such as the service levels (SLs), the minimum number of queue pairs (QP Minimum), the maximum number of queue pairs (QP Maximum), and a number of service objects available to a client via the corresponding client key. Note that multiple client keys may be defined for each supervisor key to allow, e.g., supervisor instance 122 to restrict client's 124 access to a subset of the resources accessible via the supervisor key. In an alternative embodiment, system administrator 105 associated with supervisor instances 122 and 128 may assume the responsibility of configuring the Client Pool Table records to supervisor instances 122 and 128 after the Platform Key Table and Client Key Table are defined and all resources are assigned to the supervisor keys. However, the supervisor instances 122 and 128 may only modify the resources available to the supervisor instances 122 and 128 respectively via assignments of supervisor keys and may not modify the client keys or supervisor keys in the Client Pool Table records.

Device manager 152 may then allow system administrator 144 to associate by name specific resources each host node can access and then populate a Platform Key Table such as a Platform Key Table 190 of FIG. 1B. As with many interactions with system administrator 144, system administrator 144 may generate tables 156 during the interaction with device manager 152 and/or may store configurations, instructions and/or code in configuration 158 so the tables and possibly variations of the tables may be generated and stored in tables 156 at a later time.

System administrator 144 may interact with device manager 152 to assign the supervisor key name of the resources (e.g. test, payroll, etc.) and then configure one or more nodes (e.g. GUID_1, GUID_2, etc) to access those resources. GUID_1 may represent, for instance, GUID 127 for HCA 125. Device manager 152 may generate a random number for the supervisor key and write the supervisor key to records in tables 156.

Each record of Platform Key Table 190 contains the globally unique identifier (GUID) of the corresponding host node or platform, a unique supervisor key, and a supervisor key name. The supervisor key name may be an ASCII (or UTF-8) encoded, null terminated string and may represent a usage mode for, e.g., host node 110 or supervisor instance 122 running on the host node 110. For instance, Platform Key Table 190 includes a supervisor key name "PAYROLL", which may be associated with resources that, e.g., client 124 running on supervisor instance 122 would need access to when running a payroll. Advantageously, if supervisor instance 122 is restricted to access of only payroll databases, client 124 may not accidentally corrupt data in other production resources such as the resources for an accounts receivable system associated with supervisor key name "ACCTS_RCVBL". In other embodiments, different encoding schemes may be implemented. Also note that there may be multiple supervisor keys associated with a single GUID.

Advantageously, the supervisor key names may allow, e.g., supervisor instance 122 of host node 110 to switch between supervisor key names to change accessibility of resources based upon the usage mode of supervisor instance 122. For example, if supervisor instance 122 functions as a failover system in the event of a failover condition, host node 110 may associate supervisor instance 122 with a failover mode and reboot partition 120. If supervisor instance 122 is z/OS, switching between supervisor key names may be implemented by placing the name in a new member of "SYS1.PARMLIB". Thus, supervisor instance 122 is rebooted while pointing to a different member of "SYS1.PARMLIB", and supervisor instance 122 may access a completely different set of resources. Similarly, if supervisor instance 122 is a UNIX operating system, switching between supervisor key names may be implemented by placing a configuration file in the "/etc" directory. Alternatively, a system command may be provided which tells supervisor instance 122 to switch to a new supervisor key name dynamically, so as to avoid a reboot.

System administrator 144 may then define a Client Key Table such as Client Key Table 195 of FIG. 1B. For instance, each record of Client Key Table 195 may comprise a client key and a client key name. The client key name may be an ASCII (or UTF-8) encoded, null terminated string and may represent a usage mode for the client. For instance, Client Key Table 195 includes a client key name "TEST_APP", which may be associated with resources that a client would need access to when testing a new, e.g., payroll application or accounts receivable application. Advantageously, if the client such as client 124 is restricted to access of only testing databases while testing a new payroll application, client 124 may not corrupt data in regular or production payroll databases if a coding error arises while testing the new payroll application. In other embodiments, different encoding schemes may be implemented. This allows the supervisor instance or operating system to control its client resources.

In some embodiments, a supervisor instance such as supervisor instance 122 may select the client pool table record to be used by client 124 by providing the appropriate client key name. Each application or client (e.g. DB2, CICS, etc.) has a way to define its configuration, and the client key name may be passed accordingly to define accessible resources.

Tables 156 may comprise a data storage medium to maintain, e.g., a Platform Pool Table, a Client Pool Table, a Platform Key Table, and a Client Key Table, as discussed above. In further embodiments, nodes such as host node 110 and resource node 160 may maintain corresponding records from these tables. Note that although the data structures for the Platform Pool Table, Client Pool Table, Platform Key Table, and Client Key Table are described as tables, these data structures are not limited to tables. Many other data structures would suffice to maintain the associations described herein and are contemplated implementations of the present invention.

Configuration 158 may comprise data storage such as memory, a hard drive, other magnetic media, or optical media to maintain preferences, algorithms, or other code and data to provide management node 150 with the means to generate tables 156. Configuration 158 may receive such information from a system administrator such as system administrator 105 or 144.

Host node 110 is a computer system adapted to receive supervisor keys and client keys and select a subset of the keys to use based upon one or more usage modes of host node 110, supervisor instances operating on host node 110, and/or clients operating under the supervisor instances. In the present embodiment, host node 110 comprises hardware 112, a partition manager 116, and a number of partitions represented by partitions 120 and 126. In one embodiment, host node 110 may include up to 256 operating partitions such as partitions 120 and 126.

While host node 110 is illustrated as a logically-partitioned system in the current embodiment, further embodiments may comprise other types of computer systems in addition to or in place of logically-partitioned systems. Further, while only one host node and one resource node is depicted, many embodiments implement one or more host nodes, one or more resource nodes, and/or other types of nodes that comprise resources, supervisors instances, and clients. Some embodiments also bridge together networks, host nodes, resource nodes, and other nodes managed by other configuration management nodes.

Hardware 112 represents the processor(s), memory, bussing, I/O interfaces, I/O devices, and the like. Hardware 112 comprises configuration 114. Hardware 112 also comprises host channel adapters (HCAs) 125 and 132. HCAs 125 and 132 are assigned to specific partitions 120 and 126 respectively, to physically establish communications channels for the partitions so, for clarity, HCAs 125 and 132 are illustrated within their respective partitions. Each HCA 125 and 132 comprises a globally unique identifier, GUIDs 127 and 133 to limit what supervisor keys each supervisor instance 122 and 128 can obtain. In other words, even though supervisor instances 122 and 128 are on the same node, they cannot obtain each other's supervisor keys. GUIDs 127 and 133 may be permanently burned into HCAs 125 and 132. For instance GUIDs 127 and 133 may be stored in read only memory. HCAs 125 and 132 may also comprise communications managers (CMs) 129 and 134 in order to establish communication with other CMs of other nodes such as CM 184.

Configuration 114 may include data and/or code stored in data storage of host node 110 to define usage modes for host node 110, supervisor instances such supervisor instances operating on host node 110, and/or clients operating under the supervisor instances.

Partition manager 116 is operates as an interface between hardware 112 and the one or more partitions operating on host node 110, which is adapted to distribute resources of hardware 112. For instance, partition manager 116 may provide a percentage of the memory, processing power, and data storage to each partition in accordance with, e.g., usage modes associated with the partitions.

Partitions such as 120 and 126 are virtual machines operating on host node 110. Partitions 120 and 126 execute supervisor instances 122 and 128 respectively, which are operating systems or hosts adapted to utilize supervisor and client key names to select supervisor keys and client keys, respectively, to establish communications with other nodes coupled with communications network 140. In other embodiments, supervisor instances 120 and/or 128 may comprise code executing in conjunction with the operating system for partition 120 and/or partition 126.

More specifically, once partition 120, for example, is initialized, partition 120 executes supervisor instance 122 is booted, supervisor instance 122 initializes communications connections by interacting with configuration management node 150 to obtain supervisor keys and client keys. In some embodiments, supervisor instance 122 may request all the supervisor keys and client keys associated with GUID 127. The supervisor instance 122 may then select keys from the sets received based upon a supervisor key name. The supervisor key name may be established by partition manager 116, by reading configuration 114, or by interacting with system administrator 105. In other embodiments, supervisor instance 122 may request only the supervisor keys associated with the usage mode by requesting the supervisor keys associated with a supervisor key name. The client keys may then be distributed to clients 124 when clients 124 are establishing connection authorizations with communications network 140 via supervisor instance 122.

Clients 124 and 130 may comprise applications, file systems, or other processes or code that may utilize resources coupled with communications network 140. Clients 124 and 130 utilize client key names associated with their usage mode to select one or more client keys available to clients 124 and 130 via supervisor instances 122 and 128 respectively. Note that, in many embodiments, each client of clients 124 and 130 may associate with a different client key name if multiple client key names are available. For example, as illustrated in Client Key Table 195, clients 124 may be in one of six different usage modes ("PROD_TRAN", "PROD_PAYROLL", "DEFAULT", "TEST_APP", "DB_TRAN", or "PAYROLL") depending upon which usage modes are available via supervisor instance 122. In the present embodiment, clients 124 are configured to provide a client key name associated with the clients' usage modes by accessing a configuration file associated with client 124, through interaction with system administrator 105, or other means. In some embodiments, if clients 124 does not select a client key name, supervisor instance 122 may provide a default client key name such as "DEFAULT". In other situations, supervisor instance 122 may assign a client key name to clients 124 based upon a usage mode associated with supervisor 122. For example, when only one client key name is available while supervisor instance 122 is in a particular usage mode, supervisor instance 122 may simply pass the client key(s) associated available under that usage mode to clients 124.

To illustrate, partition 120, in one embodiment, may initialize communications with communications network 140 in the following sequence. Once partition 120, for example, is initialized, partition 120 executes supervisor instance 122. Supervisor instance 122 may transmit a request to device administrator 154 for supervisor keys and the request may include GUID 127 to identify host node 110 for verification of authorization to receive the supervisor keys. Device administrator 154 may validate the request looking for records in a Platform Pool Table that include GUID 127. Upon locating the record(s) in the Platform Pool Table of tables 156, device administrator 154 may return the supervisor key(s) in that record. Supervisor instance 122 may then access configuration 114 to select a supervisor key name based upon a usage mode associated with supervisor instance 122. Once the supervisor key name is identified, supervisor instance 122 may select a subset of the supervisor keys received from device administrator 154 based upon the supervisor key name by accessing a record of a Platform Key Table in tables 156.

After selecting one or more supervisor keys based upon a supervisor key name, supervisor instance may transmit a request to device administrator 154 requesting the client keys associated with the selected supervisor keys. Note that, in the present embodiment, the keys for both the supervisor instances and the clients are considered, from a practical standpoint "unguessable" therefore, supervisor instances and clients with keys are considered to be authorized much like a password. Upon validating the request, device manager 152 may return the set of client keys associated with the selected supervisor keys to supervisor instance 122.

Once a supervisor instance has established a set of supervisor keys and client keys based upon the usage mode associated with supervisor instance 122, clients 124 may begin to initialize communications by requesting from supervisor instance, a client keys by providing a client key name. Supervisor instance 122 may then verify that the particular client of clients 124 is authorized to use the client key(s) associated with the client key name and, upon verification of the request, supervisor instance 122 may return the corresponding client key(s) to the client.

Supervisor instance 122 and clients 124 may then establish connections with other nodes coupled with communications network 140 by including the corresponding client keys in the requests to establish those connections. Communications manager 184 verifies that clients 124 are authorized to establish the communications connections with the other nodes via the keys.

In the present embodiment, supervisor instances 122 and 128 may dynamically switch between usage modes in response to an event recognized by the supervisor instance such as an instruction from system administrator 105 for reallocating one host node to supplement an overloaded host node. In such circumstances, the supervisor instance may switch to a new set of supervisor keys by, e.g., rebooting or simply requesting a new set of supervisor keys from configuration manager 151. For example, GUID 127 may correspond to GUID_1 in Platform Key Table 190 and partition 120 may be executing production applications. As a result, partition 120 may utilize supervisor key S_KEY1 associated with the "PROD" supervisor key name as described in the first record of Platform Key Table 190. When the production cycle is completed and partition 110 is reallocated for testing products, supervisor instance 122, in response to an instruction from system administrator 105, may dynamically switch partition 120 to a testing usage mode. In particular, supervisor instance 122 may re-initialize communications with communications network 140 via the supervisor key name "TEST".

Supervisor instance 122 may re-select supervisor keys and client keys based upon the supervisor key name "TEST". In accordance with Platform Key Table 190, supervisor instance 120 selects S_KEY 2. Supervisor instance 120 may then assign C_KEY3 as a "DEFAULT" usage mode to client 124 as client 124 request client keys in accordance with Client Key Table 195.

Resource node 160 may be an I/O unit that implements a device management agent such as device management agent 162 to provide access to resources for nodes coupled with communications network 140. Resource node 160 may also comprise HCA 180 to establish a communications connection in response to a request from, e.g., a client of clients 124. More specifically, HCA 180 comprises a GUID 182 to uniquely identify resource node 160 on communications network 140 and a CM 184 to enforce access rights of a connection to communications connection resources such as SLs, QPs, or the like as well as authorizations to access resources such as service objects 166, private data 168, and I/O devices 170 under the control of device management agent 162. Thus, prior to responding to a request for a connection by, e.g., a client of client 124, CM 184 checks a copy of records of tables 156 maintained in resource node 160 by device management agent 162 to determine whether resources are available to that client via the client key included within the request. In many embodiments, if the client does not have access to the resources because, e.g., the client key is invalid or is not associated with the resource, CM 184 may not respond to the request. By not responding to the request, CM 184 may hinder the ability of malicious agents or software from gaining access to resources by repetitive guessing. In further embodiments, upon receiving multiple attempts to access a resource from a requester associated with the same GUID, CM 184 may refuse connections to that requester.

Resource node 160 may comprise one or more I/O controllers 164 and associated service objects 166, private data storage 168, and/or I/O devices 168. I/O controllers 164 may comprise circuits and/or processes that provide I/O services or communications between specific resources and nodes. Service objects 166 refer to instances of service that are addressed by their corresponding QPs. For example, when a client of clients 124 establishes a connection with a service object of service objects 166, a QP is assigned to that connection. Clients 124 use different channels facilitated by the QPs to communicate with each service object.

I/O devices 170 may comprise disk drives, hard drives, and the like. I/O devices may be presented as individual service objects, each with its own QP, or as protocol objects behind a service object.

Communications network 140 may comprise a switches and communications media to facilitate communications between nodes coupled with communications network 140. In some embodiments, for instance, communications network 140 may comprise an InfiniBand™ fabric, a Fibre Channel network, or other network. More specific information about the workings of InfiniBand™ networking and the usage of keys may be found in the "Supplement to InfiniBand™ Architecture Specification Volume 1: Annex AWG7—Configuration Management", dated March 2004, and "Supplement to InfiniBand™ Architecture Specification Volume 1: Annex AWG8—Device Management", dated March 2004. These specifications are incorporated herein by reference.

Figure 1A:
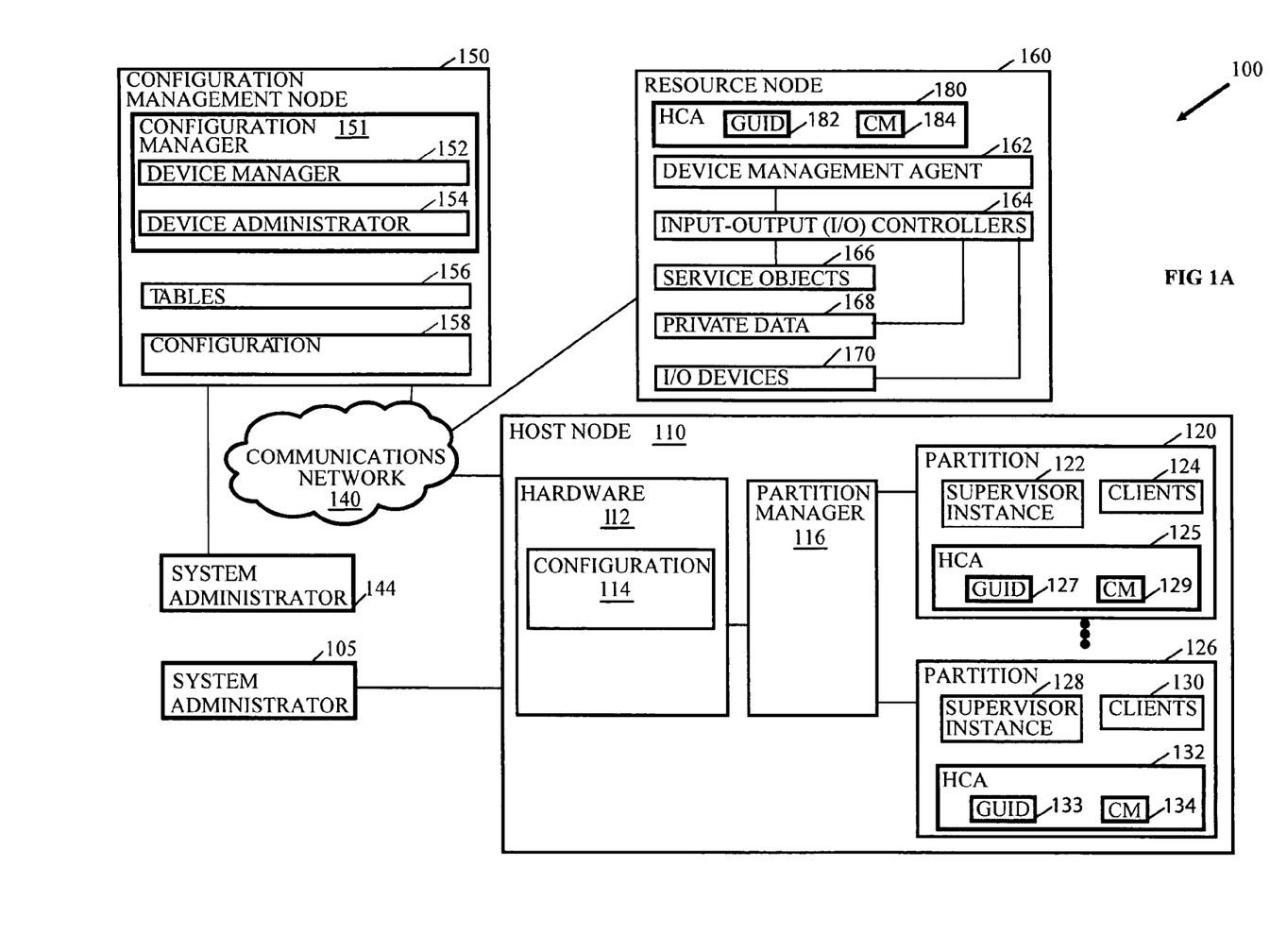
FIG. 1A depicts an embodiment of a system having a management node to manage communications between a host node and a resource node.
Figure 1B:
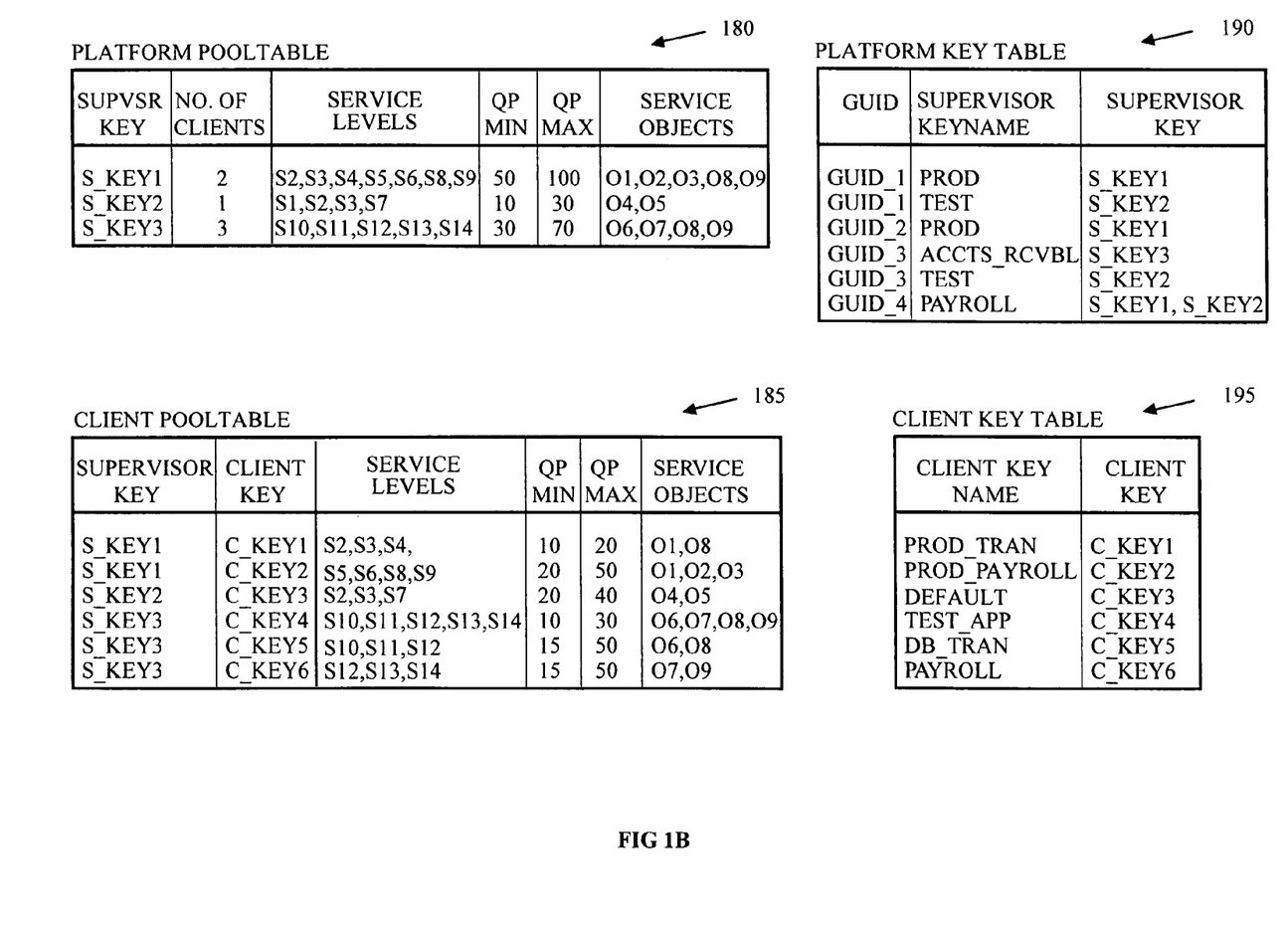
FIG. 1B depicts embodiments Platform and Client Pool and Key Tables as described in conjunction with FIG. 1A.
Figure 2:
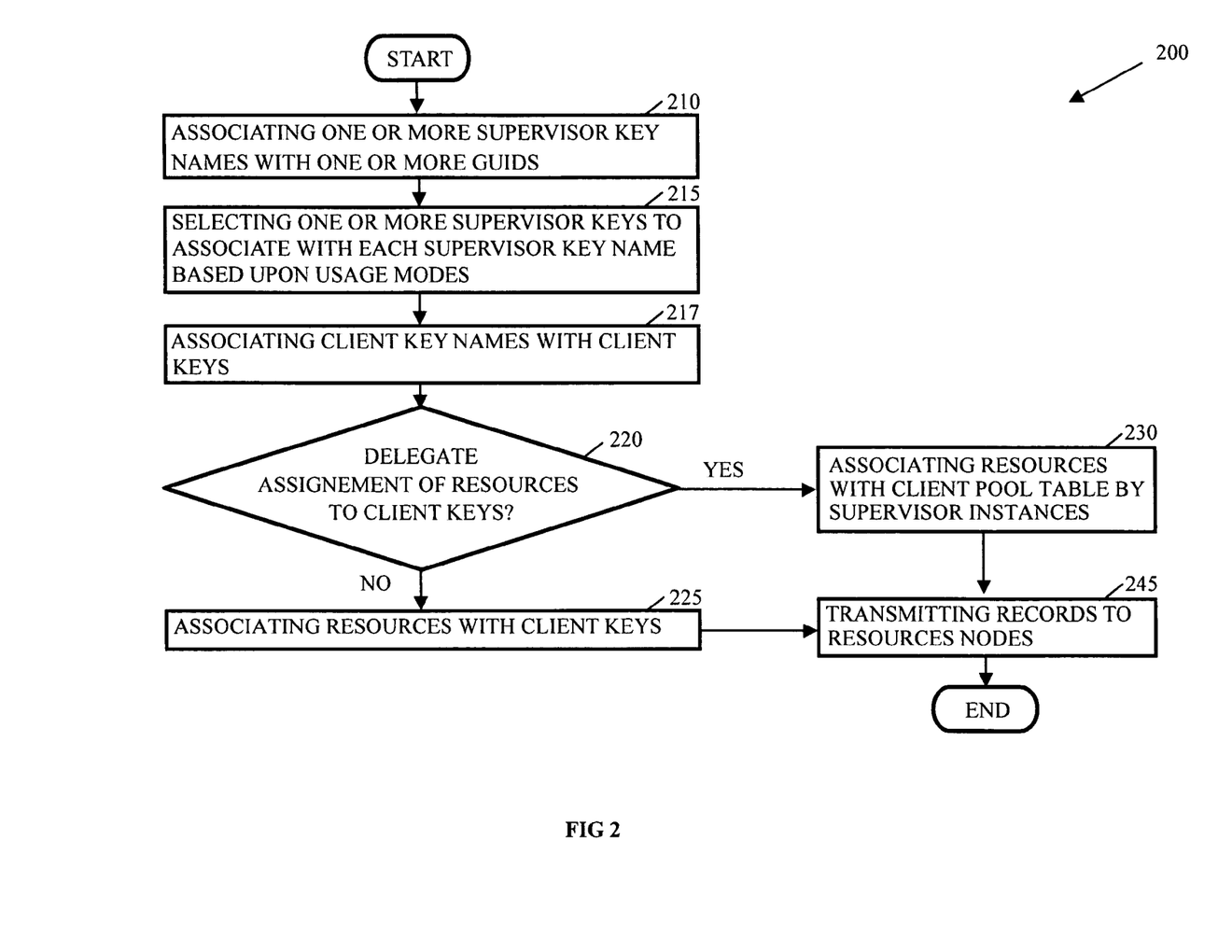
FIG. 2 depicts a flowchart of an embodiment for creating a Platform Key Table and a Client Key Table on a management node.

FIG. 2 depicts a flowchart 200 of an embodiment for creating a Platform Key Table and a Client Key Table on a configuration management node such as configuration management node 150 of FIG. 1A. Flowchart 200 begins after the configuration management node has created a Platform Pool Table and a Client Pool Table. Flowchart 200 begins by associating one or more supervisor key names with one or more globally unique identifiers (GUIDs) (element 210). For example, the configuration management node may interact with a system administrator or access a configuration file to populate a Platform Key Table with supervisor key names so that supervisor instances may subsequently access the supervisor keys associated with one or more supervisor key names. The GUIDs may uniquely identify nodes coupled with the configuration management node.

After populating the Platform Key Table with the GUIDs and supervisor key names, the configuration management node may associate one or more supervisor keys with each supervisor key name based upon usage modes associated with the supervisor key names (element 215). For instance, a supervisor key name may be representative of a testing environment established by a supervisor instance. The supervisor instance may, e.g., execute clients that are new applications, which need to be tested before implementing the applications in an environment that allows the applications to access established resources such as databases for an accounting system. Restricting the supervisor instance to a set of resources dedicated for testing the new applications advantageously avoids corruption of the established databases due to inadvertent access to the production versions.

The configuration management node may then associate client key names with the client keys in the Client Key Table (element 217). In some embodiments, the client key names may be read from a configuration file. In further embodiments, the configuration management node may interact with a system administrator to populate a Client Key Table with client key names.

The configuration management node may then delegate the assignment of resources associated with the client key names to the corresponding supervisor instances (element 220). If the allocation of resources is not delegated to the corresponding supervisor instances, the configuration management node may assign the resources via interaction with a system administrator or through established configurations in a configuration file (element 225).

On the other hand, when allocation of resources to the client keys is delegated to the corresponding supervisor instances, the supervisor instances may communicate with the configuration management node to populate records of the Client Pool Table (element 230).

After populating the Client Pool Table, the configuration management node may transmit records of the tables to the corresponding resource nodes (element 245). The resource nodes may then validate requests for access to resources of the nodes by verifying associations between client keys and the resources.

Figure 3:
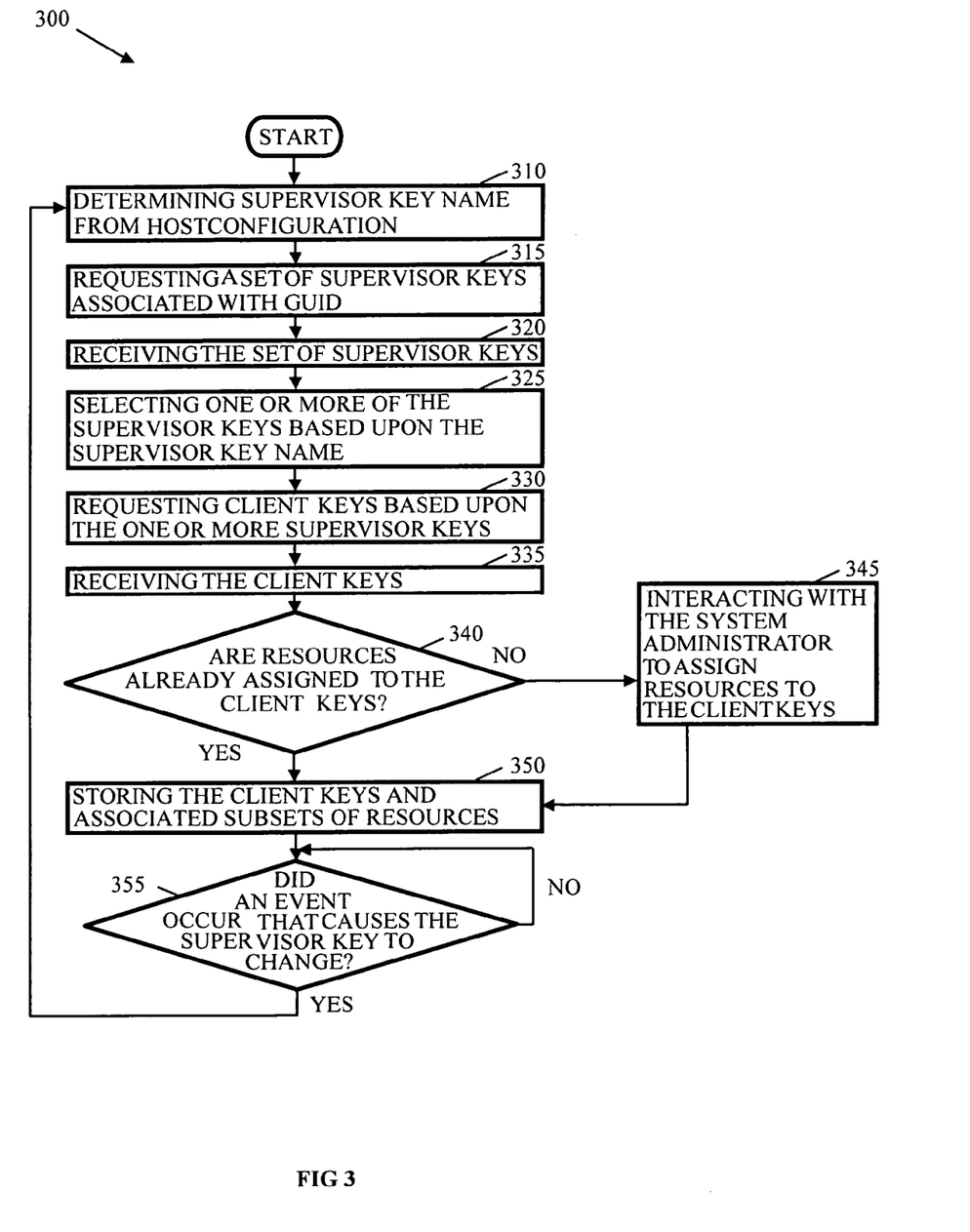
FIG. 3 depicts a flowchart of an embodiment for initializing a supervisor instance on a host node to have access to resources consistent with the current usage mode of the supervisor instance.

FIG. 3 depicts a flowchart 300 of an embodiment for initializing a supervisor instance on a host node to have access to resources consistent with the current usage mode of the supervisor instance. Flowchart 300 begins by determining a supervisor key name from a host node configuration file to associate with the supervisor instance based upon the usage mode of the supervisor instance (element 310). The supervisor instance may then request a set of supervisor keys associated with the supervisor instance by including the host nodes GUID in the request (element 315). Upon verification that the supervisor instance is authorize to receive the supervisor keys, the supervisor instance may receive the entire set of supervisor keys available to the platform or host node upon which the supervisor instance is executing (element 320).

The supervisor instance may then select a subset of the set of supervisor keys to utilize when establishing communications with other nodes based upon a supervisor key name (element 325). Upon selection of the subset of supervisor keys that are associated with the supervisor key name, and thus, the usage mode associated with the supervisor instance, the supervisor instance may request a set of client keys based upon the subset of supervisor keys selected by the supervisor instance (element 330).

In response to the request, the supervisor instance may receive the client keys (element 335). If the client keys may have not been assigned subsets of the resources available to the supervisor instance (element 340), the supervisor instance may interact with a system administrator to assign specific resources such as service objects, QPs, and the like to each of the client keys (element 345). Otherwise, the client keys and associated resources may be stored in a record on the node or coupled with the node upon which the supervisor instance is operating (element 350).

Once the supervisor instance has the client keys and the resource assignments for the client keys, the supervisor instance may assign resources to clients operating under the supervisor instance and then the clients may establish connections with other nodes coupled with the communications network. However, in many embodiments, an event may occur which requires the supervisor instance to change usage modes (element 355). For example, the primary server fails or an unusual demand is made of the supervisor instance and the supervisor instance needs additional resources. As a result, the supervisor instance may be rebooted, and upon reboot, the supervisor instance may reinitialize starting at element 310.

Figure 4:
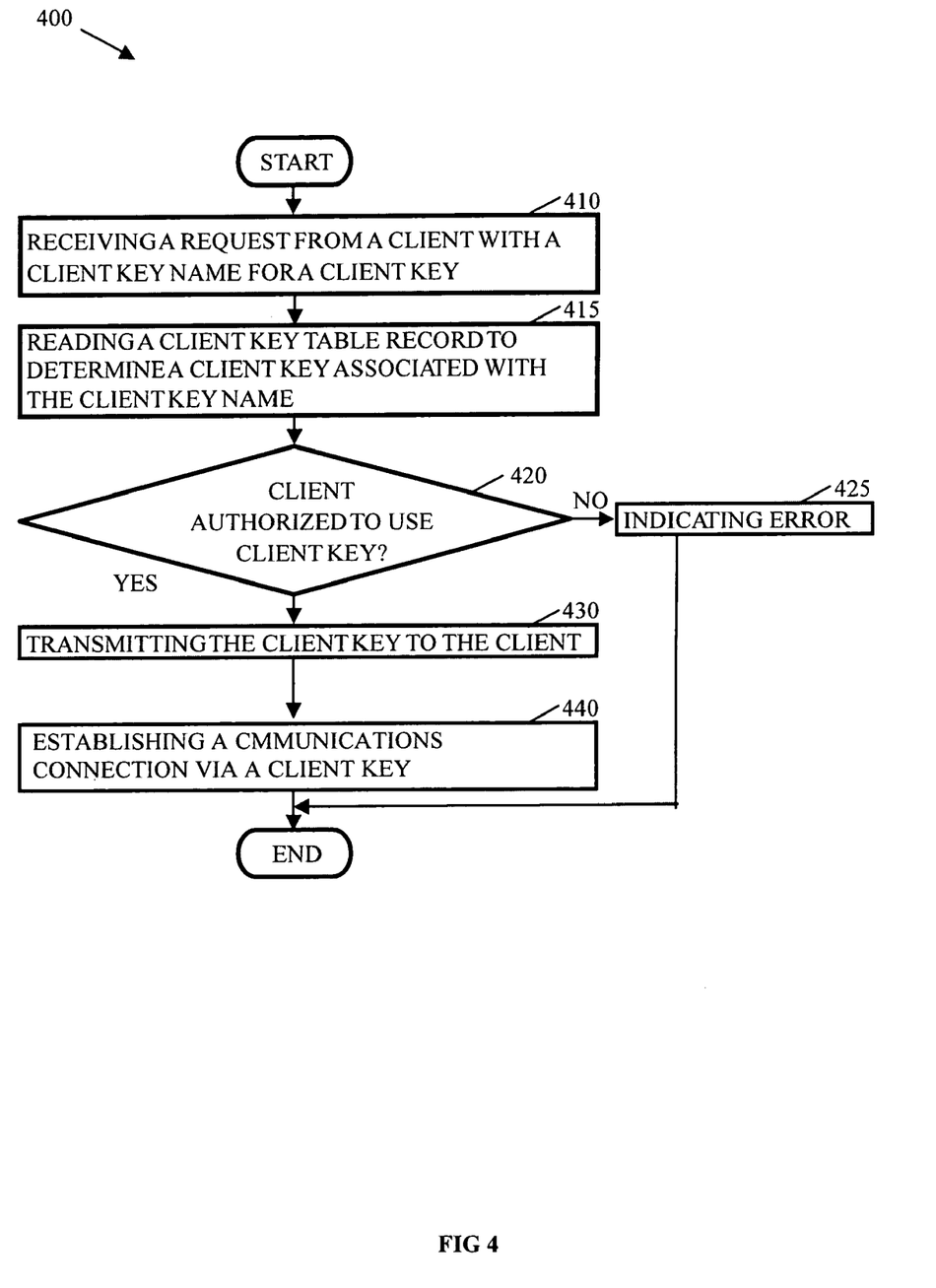
FIG. 4 depicts a flowchart of an embodiment of an interface for supervisor instance to establish access for a client to a subset of resources available to the supervisor instance.

FIG. 4 depicts a flowchart 400 of an embodiment of an interface for supervisor instance to establish access for a client to a subset of resources available to the supervisor instance. Flowchart 400 may begin by receiving a request from a client with a client key name for a client key (element 410). The supervisor instance may respond by reading a Client Key Table record to determine a client key associated with the client key name (element 415). The client key name may advantageously identify a usage mode for the client so the supervisor instance can provide the client with a client key that restricts that client's access to only the resources necessary for the client's operation.

Upon receipt of the request for the client key, the supervisor instance may verify that the client is authorized to utilize the client key via, e.g., a private algorithm (element 420). When the client is not authorized to utilize the client key, the supervisor instance may respond by indicating an error (element 425). If the client is authorized to utilize the client key, the supervisor instance may transmit the client key to the client (element 430).

After the client is assigned one or more client keys, the client may establish a connection with a resource associated with a client key by including the client key in the request to establish the communication connection (element 435). The client may then access the resource via the established communications connection.

Figure 5:
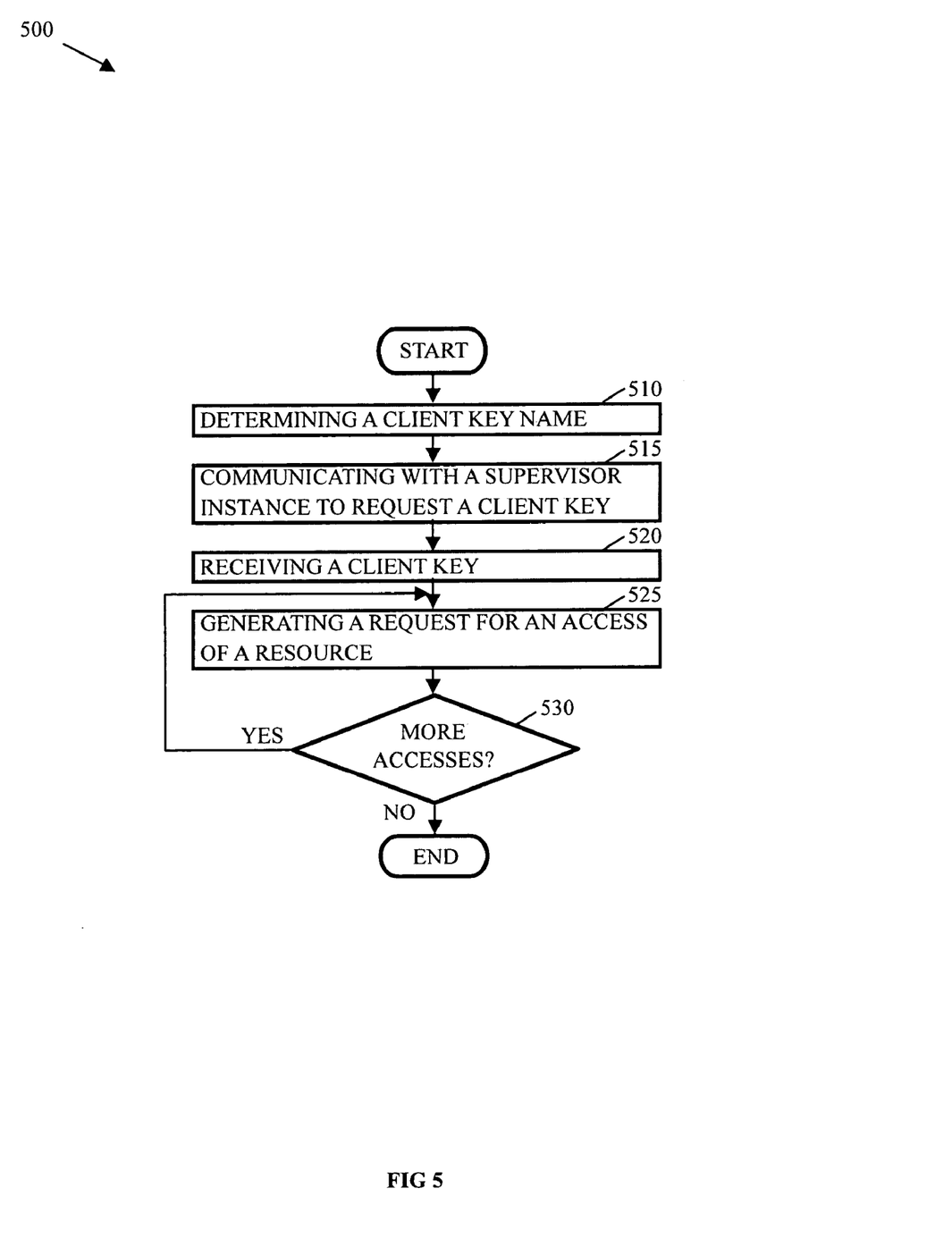
FIG. 5 depicts a flowchart of an embodiment for initializing a client on a host node to have access to a subset of resources accessible to a supervisor instance and consistent with the current usage mode of the supervisor instance.

FIG. 5 depicts a flowchart of an embodiment for initializing a client on a host node to have access to a subset of resources accessible to a supervisor instance and consistent with the current usage mode of the supervisor instance. Flowchart 500 may begin by determining a client key name (element 510). The client key name may be established, for example, in a configuration file for the client so the client may read the configuration file and, based upon the content of the file, select a client key name or simply read the client key name defined for the client in the file After identifying a client key name, the client may communicate with the supervisor instance to request client keys associated with the client key name (element 515). The client may then receive one or more client keys, which identify a subset of the resources available to the supervisor instance (element 520).

Upon receipt of the one or more client keys, the client may establish a communication connection to access a resource associated with the client keys by including one or more of those client keys in the request to establish the communications connection (element 525). If the client needs establish additional connections with resources, the client may generate requests to establish those connections (element 530) assuming the client has sufficient resources such as QPs to establish the additional connections.

Another embodiment of the invention is implemented as a program product for use with a system such as, for example, system 100 as shown in FIG. 1. The program(s) of the program product defines functions of the embodiments (including the methods described herein) and can be contained on a variety of data and/or signal-bearing media. Illustrative data and/or signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such data and/or signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by a computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

It will be apparent to those skilled in the art having the benefit of this disclosure that the present invention contemplates methods and arrangements to adjust resource accessibility based upon usage modes. It is understood that the form of the invention shown and described in the detailed description and the drawings are to be taken merely as examples. It is intended that the following claims be interpreted broadly to embrace all the variations of the example embodiments disclosed.

Although the present invention and some of its advantages have been described in detail for some embodiments, it should be understood that various changes, substitutions and alterations can be made herein without departing from the spirit and scope of the invention as defined by the appended claims. Further, embodiments may achieve multiple objectives but not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method to define a subset of resources available to a supervisor instance to assign to clients operating under the supervisor instance, the method comprising:
    communicating an identifier of a host node to a configuration manager to determine a set of supervisor keys associated with the host node based upon the identifier, which identifies the host node upon which the supervisor instance is operating to the configuration manager;
    establishing, by the supervisor instance, a supervisor key name associated with the supervisor instance, the supervisor key name based upon a usage mode associated with operation of the supervisor instance;
    requesting, from the configuration manager, one or more supervisor keys of the set of supervisor keys associated with the supervisor key name; and
    receiving, by the supervisor instance, the one or more supervisor keys, the one or more supervisor keys to verify authorization for the supervisor instance to access the subset of resources, wherein the subset of resources comprise a number of queue pairs that can be consumed by the supervisor instance, the queue pairs being queues in a communications network coupled with the host node for both transmission and reception sides of a communication connection for the supervisor instance, and to obtain a set of client keys, wherein each client key of the set of client keys, when attached to a request by the client, provides verification of an authorization for the client related to establishment of a connection, the connection being associated with a resource of the subset of resources.

2. The method of claim 1, further comprising
    generating a Client Key Table based upon a interaction with a system administrator, wherein the Client Key Table defines usage modes for the clients associated with the supervisor instance via client key names, the client key names to be used to associate resources from the subset of the resources available to the supervisor instance with each client key of the set of the client keys.

3. The method of claim 1, further comprising dynamically switching the association of the supervisor instance from the one or more supervisor keys to a second group of one or more supervisor keys.

4. The method of claim 3, wherein dynamically switching the association comprises changing the usage mode of the supervisor instance to a new usage mode in response to an event and selecting the second group of one or more supervisor keys via a second supervisor key name associated with the new usage mode.

5. The method of claim 1, further comprising:
    receiving a request for a client key of the set of client keys from the client, wherein the request comprises a client key name associated with the client key;
    determining whether the client is authorized to use the client key;
    reading the client key from a record that associates the client key name with the client; and
    transmitting the client key to the client after determining that the client is authorized to use the client key.

6. The method of claim 5, further comprising generating the request to establish the connection with the resource, the request comprising the client key as verification of the authorization for the client to access the resource.

7. The method of claim 5, further comprising generating the request to establish the connection, the request comprising the client key as verification of the authorization for the client to use the resource to establish the connection.

8. The method of claim 5, further comprising generating the request to establish the connection, the request comprising the client key as verification of the authorization for the client to consume the resource.

9. The method of claim 5, wherein determining whether the client is authorized to use the client key comprises executing a private algorithm.

10. The method of claim 1, wherein communicating the identifier of the host node to the configuration manager to determine the set of supervisor keys comprises generating a supervisor key request for the set of supervisor keys comprising the identifier and transmitting the supervisor key request to the configuration manager, wherein the configuration manager is to reply with the supervisor keys upon verification of the association between the identifier and the supervisor keys.

11. The method of claim 10, further comprising generating a client key request for the set of client keys associated with the supervisor instance and transmitting the request to the configuration manager, wherein the configuration manager is to reply with the set of the client keys based upon the one or more supervisor keys associated with the supervisor instance.

12. The method of claim 1, wherein requesting one or more supervisor keys comprises accessing a record of a Platform Key Table associated with the supervisor key name.

13. A system, comprising:
a configuration to define tables that associate supervisor keys with client keys and with unique host identifiers of nodes to couple with a communications network; and
a configuration manager coupled with the configuration to define authorized connections between the nodes based upon associations in the tables to prevent unauthorized connections, wherein the configuration manager is adapted to associate one or more supervisor key names with one or more of the unique host identifiers and select one or more supervisor keys of the supervisor keys to associate with a supervisor key name of the one or more supervisor key names, wherein association of the one or more supervisor keys with the supervisor key name defines a subset of resources that are available to a supervisor instance, the subset of resources comprising a number of queue pairs that can be consumed by the supervisor instance, the queue pairs being queues in the communications network, coupled with a host node upon the supervisor instance is operating, for both transmission and reception sides of a communication connection for the supervisor instance.

14. The system of claim 13, further comprising the communications network, wherein the communications network comprises switches and media to establish connections between the nodes.

15. The system of claim 13, further comprising a host node of the nodes coupled with the communications network, the host node comprising the supervisor instance, wherein the supervisor instance is adapted to select the supervisor key name based upon a usage mode and obtain the one or more supervisor keys from the configuration manager based upon the supervisor key name.

16. The system of claim 15, wherein the supervisor instance is adapted to receive a request for a client key of the client keys from a client, the request comprising a client key name associated with the client key; determine whether the client is authorized to use the client key based upon an association between the client key and the one or more supervisor keys; and pass the client key to the client after determining that the client is authorized to use the client key.

17. The system of claim 13, wherein the configuration manager is adapted to generate a Client Key Table by interacting with a system administrator to determine client key names, generating client keys to associate with subsets of the resources available to the supervisor instance, and communicating with a system administrator to associate the client keys with the client key names based upon usage modes represented by the client key names.

18. A machine-accessible, storage medium containing instructions, which when executed by a machine, cause the machine to perform operations for defining access by a client to a subset of resources available to a supervisor instance, comprising:
determining, by the client, a client key name associated with a usage mode for the client;
requesting a client key from the supervisor instance based upon the client key name;
receiving the client key from the supervisor instance, the client key being associated with the subset of the resources, the subset of resources comprising a number of queue pairs that can be consumed via the client key, the queue pairs being queues in a communications network, coupled with a host node upon the supervisor instance is operating, for both transmission and reception sides of a communication connection for the client; and
associating the client key with a request to establish a connection via one or more of the queue pairs to provide a verification that the client is authorized to access the one or more of the queue pairs.

19. The machine-accessible, storage medium of claim 18, wherein determining, by the client, the client key name comprises accessing a client configuration established by a system administrator that defines a usage mode for the client and the client key name associated with that usage mode.

20. The machine-accessible, storage medium of claim 18, wherein receiving the client key comprises receiving a unique binary number associated with the subset of the resources available to the client when operating in the usage mode.

* * * * *

UNITED STATES PATENT AND TRADEMARK OFFICE
CERTIFICATE OF CORRECTION

PATENT NO. : 7,657,945 B2 Page 1 of 1
APPLICATION NO. : 11/070053
DATED : February 2, 2010
INVENTOR(S) : Brey et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1214 days.

Signed and Sealed this

Twenty-eighth Day of December, 2010

David J. Kappos
*Director of the United States Patent and Trademark Office*